Nov. 14, 1933.　　　C. M. ELLENBERGER　　　1,934,848
FENDERWELL LOCK
Filed June 20, 1931
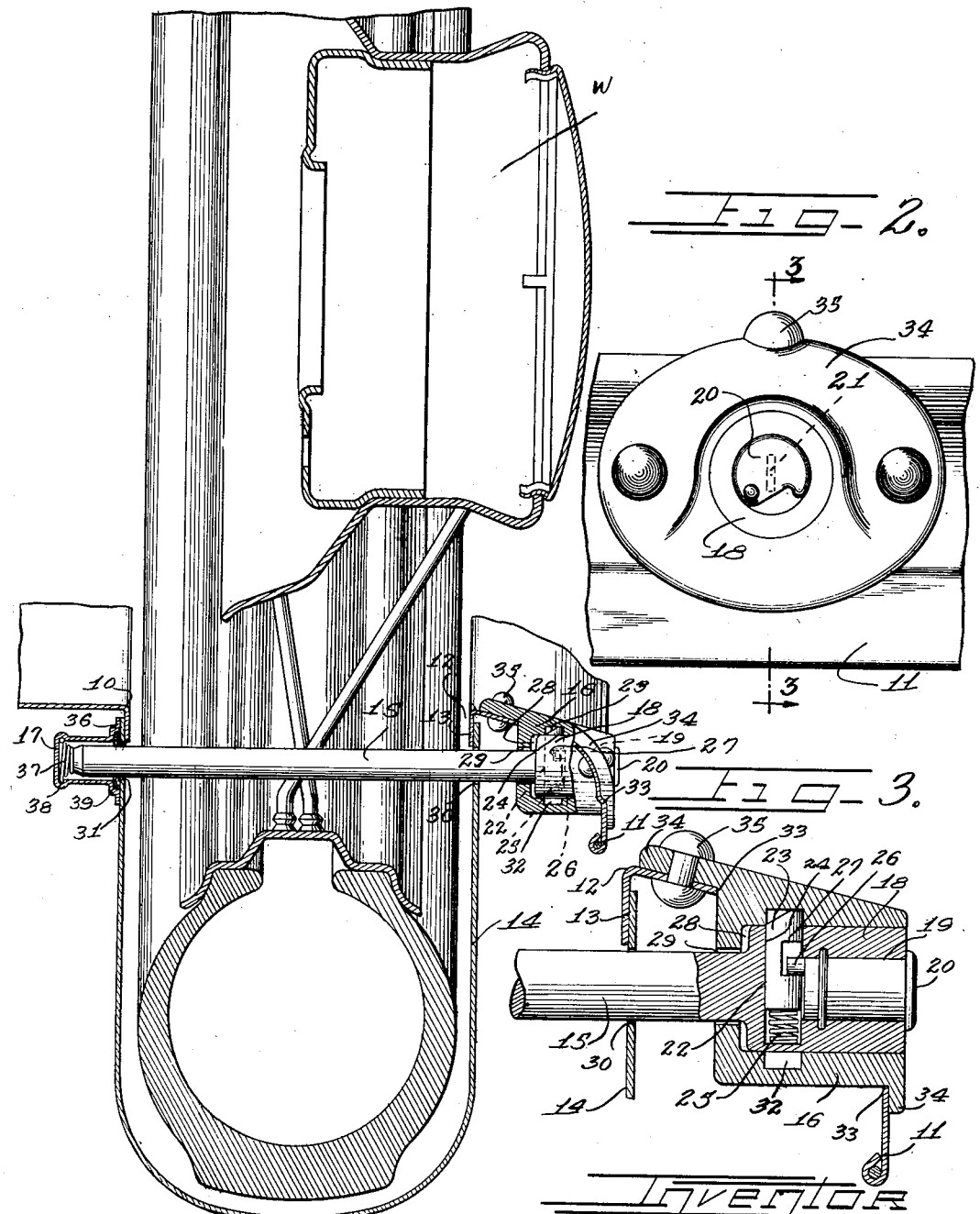
Inventor
Clarence M. Ellenberger.
by Charles Hills
Attys.

Patented Nov. 14, 1933

1,934,848

UNITED STATES PATENT OFFICE 1,934,848

FENDERWELL LOCK

Clarence M. Ellenberger, Detroit, Mich., assignor to Oakes Products Corporation, North Chicago, Ill., a corporation of Michigan Application June 20, 1931. Serial No. 545,671

6 Claims. (Cl. 70—90)

This invention relates to improved locking means and arrangement for locking spare wheels or tires against theft from supporting wells therefor provided in the front fender of automotive vehicles.

The invention relates particularly to the type of locking means comprising a bar for extending transversely of the well in position over the lower part of the spare wheel or tire to be locked in the well. At the present time, the trend is toward deeper wells in order to keep the wheel or tire lower on the vehicle, and the general object of the invention is to so arrange the locking means that the locking bar may be supported low enough to be in position just above the lower part of the spare wheel or tire to prevent vertical displacement thereof.

In accordance with my invention, the supporting members or fittings for the locking bar are located at the opposite sides of the well below the fender wall along side of the well, which arrangement will bring the locking bar down low enough relative to the spare tire or wheel and also remove the fittings from the top of the fender where they might form obstructions and where they could be more readily tampered with.

The various features of my invention are incorporated in the structure disclosed on the accompanying drawing, in which drawing:

Figure 1 is a vertical section through a fenderwell and a spare wheel supported therein with the locking means applied and partly in vertical section;

Figure 2 is an enlarged side view of part of the fender with the locking means in end elevation;

Figure 3 is a section line III—III, Figure 2.

On the drawing:

10 indicates one of the front fenders of an automobile, the fender having along its outer side the depending roll or skirt 11, this being usual fender construction. The fender is cut out to leave an opening 12 and the metal adjacent the opening is deflected downwardly to form the supporting flange 13 to which the fenderwell body 14 is secured to be suspended below the opening 12 for the reception of spare wheels or spare tires in the usual manner. I have shown a spare wheel W supported in the well.

The locking means comprises a locking bar or bolt 15 and the supporting fittings 16 and 17 therefor. The bolt has the enlarged cylindrical head 18 having a cylindrical bore 19 for receiving a lock barrel 20 rotatable by a suitable key inserted in the key hole 21. At its inner end, the head has the transverse guideway 22 which communicates with the bore 19 and serves to guide a locking detent or bolt 23, the bolt head having the opening 24 through which the beveled end of the detent may be projected by a spring 25 interposed in the guideway 22 behind the detent. The lock barrel 20 has the cam extension 26 engaging in the notch 27 in the locking detent so that when the lock barrel is turned by the key the locking detent will be withdrawn from the opening 24.

The fitting 16 may be cylindrical as shown and has the cylindrical pocket 28 for receiving the bolt head 18, the inner wall or base of the fitting having the opening 29 through which the shank of the bolt 15 may extend. In register with the opening 29 the outer and inner walls of the well 14 have the openings 30 and 31 therethrough through which the bolt shank is extended to engage at its end in the fitting 17. The housing 16 has the annular channel 32 which is in registration with the opening 24 in the bolt head to receive the lock detent 23 when it is projected. When the locking bolt 15 is inserted, the engagement of the bevelled end of the detent with the housing 16 will shift the detent inwardly until the channel 32 is reached when the spring 25 will then shift the detent outwardly into the channel, the bolt head and bolt being then locked against axial outward movement. Upon insertion of the key and turning of the lock barrel 20, the locking detent may be withdrawn to release the bolt from the housing 16 so it may be pulled out.

The housing 16 is in greater part below the skirt 11 of the fender, the skirt having the opening 33 therethrough through which the housing may be inserted. The flange 34 extends from and surrounds the housing 16 and is shaped to accurately fit against the outer surface of the fender skirt, and the flange may be secured to the skirt by welding or, as shown, by means of rivets 35 so that the housing will be rigidly secured to the fender skirt. The location of the housing 16 and the fitting 17 below the fender will bring the locking bolt 15 into proper position to extend across the well just above the lower part of the rim of the spare wheel or tire to be locked in the well.

The fitting 17 may be in the form of a cylindrical sheet metal cup having a flange 36 by means of which it may be secured against the outer side of the inner wall of the well 14 as by spot welding or by means of rivets. A coil abutment spring 37 is provided at the inner end of the fitting 17 and the fitting end may be deflected to form an annular recess 38 for receiving the outer coil of the spring in order that the spring will be anchored against displacement from the fitting. The spring is of such axial length that when the locking bolt 15 is applied and locked in the housing 16 its outer end will engage with and compress the spring so that the bolt will be held against axial displacement and rattling during travel of the vehicle. The spring also serves the purpose of shifting the locking bolt a distance outwardly when the key has been turned in the lock to release the detent 23 from the housing 16, and after such preliminary outward shift of the bolt its head may be grasped and the bolt can be readily withdrawn from the fender for removal of the spare wheel or tire. The end of the bolt 15 may be tapered as shown in order that it may be more readily guided through the various openings into locking position. Rearwardly of its flange 36, the fitting 17 may be expanded to form a pocket for a packing washer 39 which will prevent transverse displacement or rattling of the locking bolt when in locking position.

As shown in Figure 1, the locking bolt 15 is in locking position over the lower part of the spare wheel W. To remove the bolt, the key is inserted in the lock barrel and the barrel is turned to withdraw the lock detent 23 whereupon the spring 37 will shift the bolt a distance outwardly from the housing 16 and the bolt may then be grasped and fully withdrawn. After placing of a spare tire or wheel in the well, the bolt is inserted through the housing 16 and the fenderwell openings 30 and 31 and into the fitting 17 against the pressure of the spring 37 until the lock detent 23 comes into registration with the locking channel 32 and is forced out by its spring 25 into locking engagement with the housing, the locking bolt being then securely held in locking position to lock the spare wheel or tire against theft. The placing of the supporting fittings for the bolt below the top wall of the fender leaves the fender top free of obstruction and gives a neater appearance. The fittings are also protected from the weather by the overhanging fender and are also in position where they cannot be very readily tampered with and forcibly broken away.

I have shown a practical and efficient embodiment of the features of my invention but do not desire to be limited to the exact construction and arrangement shown as changes and modifications may be made without departing from the scope and principles of the invention as defined by the appended claims.

I claim as follows:

1. In a fenderwell lock for spare tires or spare wheels, a pair of members secured to the fender one at each side of the well and below the fender top, a bolt slidably supported by the two members to extend crosswise of the open space of the well and below the top thereof to prevent unauthorized removal of a spare wheel or tire therefrom, the bolt and one of said members being provided with a coacting detent and notch adapted to secure the bolt against sliding movement, and a lock mechanism for operating the detent whereby to free the bolt for sliding movement relative to the two members.

2. In combination with a fender having an opening and a frame depending therefrom forming a well for receiving a spare wheel or tire, a locking bolt, the outer and inner walls of the well frame having registering passageways for receiving said bolt, outer and inner supporting fittings for said bolt below the fender wall along side of said well, said outer fitting being secured to the fender wall adjacent to said well and having a pocket, said outer fitting having a passageway in its inner wall in registration with the passageway through the outer wall of the well frame for projection therethrough of the bolt shank and said bolt having a head for engaging in said pocket, said inner fitting receiving the bolt end when said bolt is projected through said outer fitting and across the well, and locking mechanism for locking said head in said outer fitting.

3. In combination with a fender having a skirt along its outer edge and having an opening and a frame depending therefrom forming a well for receiving a spare wheel or tire, a locking bolt, the outer and inner walls of the well frame having registering passageways for receiving said bolt, outer and inner supporting fittings for said bolt in alignment with said passageways, said outer fitting being supported entirely by the fender skirt and having a pocket for receiving the bolt head and an opening through its rear wall through which the bolt shank extends for projection through said passageways, said inner fitting receiving the bolt end when said bolt is projected across the well, and locking mechanism for locking the bolt head in said outer fitting.

4. In combination with a fender having a skirt along its outer edge and having a well frame depending therefrom inwardly of said skirt for receiving a spare wheel or tire, a locking bolt, the outer wall of said well frame having a passageway below said skirt, a fitting supported entirely by said skirt and having a pocket for receiving the bolt head and having an opening through its rear wall in register with the well wall passageway for projection of the bolt shank into said well below the top thereof to prevent unauthorized removal of a spare wheel or tire from the well, and locking mechanism for locking the bolt head to said fitting.

5. In combination with a fender having a skirt along its outer edge and having a well frame depending therefrom inwardly of said skirt, a locking bolt, the outer wall of said well frame having a passageway therethrough below said skirt, said skirt having an opening therethrough, a fitting seated in said skirt opening and having an escutcheon flange whereby it is secured to the skirt to be entirely supported thereby, said fitting having a pocket for receiving the head of the bolt and having an opening through its rear wall in alignment with the passageway through the well frame wall through which opening and passageway the shank of the bolt is extended to project into the well to prevent unauthorized removal of a spare wheel or tire therefrom, and locking mechanism for locking the bolt head to said fitting.

6. In combination with a fender having a skirt along its outer edge and having a well frame depending therefrom for receiving a spare wheel or tire, a locking bolt, the outer wall of said well frame having a passageway below said skirt, said skirt having an opening in line with said well frame passageway, an escutcheon plate mounted on said skirt and secured thereto to close the skirt opening, a lug extending from said plate through the skirt opening and having a pocket for receiving the bolt head and an opening through its rear wall in register with the well frame passageway for projection of the bolt shank into said well below the top thereof to prevent unauthorized removal of a spare wheel or tire, and locking mechanism for locking the bolt head to said lug.

CLARENCE M. ELLENBERGER.